United States Patent
Cradick et al.

(10) Patent No.: US 9,996,632 B2
(45) Date of Patent: *Jun. 12, 2018

(54) PROCESSING A STREAM OF TUPLES

(71) Applicant: International Business Machines Corporation, Armonk, NY (US)

(72) Inventors: Ryan K. Cradick, Oronoco, MN (US); Victor Dogaru, Alameda, CA (US); Peter A. Nicholls, Janetville, CA (US)

(73) Assignee: International Business Machines Corporation, Armonk, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 14/718,205

(22) Filed: May 21, 2015

(65) Prior Publication Data

US 2016/0344788 A1 Nov. 24, 2016

(51) Int. Cl.
G06F 15/16 (2006.01)
G06F 17/30 (2006.01)
H04L 29/06 (2006.01)
H04L 29/08 (2006.01)

(52) U.S. Cl.
CPC .. G06F 17/30958 (2013.01); G06F 17/30516 (2013.01); G06F 17/30864 (2013.01); H04L 65/605 (2013.01); H04L 67/28 (2013.01)

(58) Field of Classification Search
CPC ......... G06F 17/30958; G06F 17/30516; G06F 17/30864; H04L 65/605; H04L 67/28
USPC ........................................................ 709/217
See application file for complete search history.

(56) References Cited

U.S. PATENT DOCUMENTS

| | | | |
|---|---|---|---|
| 5,836,014 A * | 11/1998 | Faiman, Jr. | G06F 8/433 717/147 |
| 7,644,110 B2 | 1/2010 | Nishizawa et al. | |
| 8,560,526 B2 | 10/2013 | Santosuosso et al. | |
| 8,560,602 B2 | 10/2013 | Andrade et al. | |
| 2007/0203693 A1* | 8/2007 | Estes | G06N 5/022 704/9 |
| 2013/0018943 A1* | 1/2013 | Andrade | G06F 8/35 709/203 |
| 2014/0164356 A1 | 6/2014 | Branson et al. | |
| 2014/0289240 A1 | 9/2014 | Barsness et al. | |

(Continued)

OTHER PUBLICATIONS

M. Hirzel, IBM Streams Processing Language: Analyzing Big Data in mition, Jul. 2013.*

(Continued)

*Primary Examiner* — Joseph L Greene
(74) *Attorney, Agent, or Firm* — Jay Wahlquist

(57) ABSTRACT

A stream of tuples may be processed by receiving at a first stream operator a first tuple from a stream of tuples. In response to receiving the first tuple, port mutability conditions for a first stream operator and a second stream operator may be analyzed. In response to identifying the port mutability conditions for a first stream operator and a second stream operator, a first set of attribute mutability conditions for the first tuple received at the first stream operator may be identified. Based on the first set of attribute mutability conditions, a reference of an attribute from the first tuple may be generated where the reference is added to a second tuple passing from the first stream operator to the second stream operator.

13 Claims, 8 Drawing Sheets

(56) References Cited

U.S. PATENT DOCUMENTS

2016/0071233 A1* 3/2016 Macko ................ G06T 11/206
　　　　　　　　　　　　　　　　　　　　　　345/440
2016/0306896 A1* 10/2016 Paradies ........... G06F 17/30979

OTHER PUBLICATIONS

Cradick, et al., "Processing a Stream of Tuples", U.S. Appl. No. 14/749,073, filed Jun. 24, 2015.
List of IBM Patents or Patent Applications Treated as Related.
Branson, et al., "Reconfiguring an Operator Graph Based on Attribute Usage", U.S. Appl. No. 14/742,774, filed Jun. 18, 2015.
Ballard, et al., "IBM InfoSphere Streams: Harnessing Data in Motion", IBM Redbooks, First Edition. Sep. 2010. 360 pages. © Copyright International Business Machines Corporation 2010.
Branson, et al., "Generating Differences for Tuple Attributes", U.S. Appl. No. 13/919,378, filed Jun. 17, 2013.
Branson, et al., "Generating Differences for Tuple Attributes", U.S. Appl. No. 14/094,095, filed Dec. 2, 2013.
Branson, et al., "Reconfiguring an Operator Graph Based on Attribute Usage", U.S. Appl. No. 13/864,784, filed Apr. 17, 2013.
Branson, et al., "Runtime Tuple Attribute Compression", U.S. Appl. No. 13/867,169, filed Apr. 22, 2013.
Branson, et al., "Compile-Time Tuple Attribute Compression", U.S. Appl. No. 13/867,211, filed Apr. 22, 2013.

* cited by examiner

PROCESSING A STREAM OF TUPLES

BACKGROUND

The present disclosure relates generally to the field of stream computing, and more particularly to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Aspects of the disclosure provide a method, system, and computer program product for processing data. The method, system, and computer program product may include receiving at a first stream operator, a first tuple from a stream of tuples. In response to receiving the first tuple, port mutability conditions for a first stream operator and port mutability conditions for a second stream operator may be analyzed. From the first tuple received at the first stream operator, a first set of attribute mutability conditions may be identified. Based on the first set of attribute mutability conditions and further based on the port mutability conditions for the first stream operator and the port mutability conditions for the second stream operator, a reference to an attribute from the first tuple may be generated. In response to generating the reference, the attribute from the first tuple may be replaced with the reference to the attribute by adding the reference to a second tuple passing from the first stream operator to the second stream operator.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
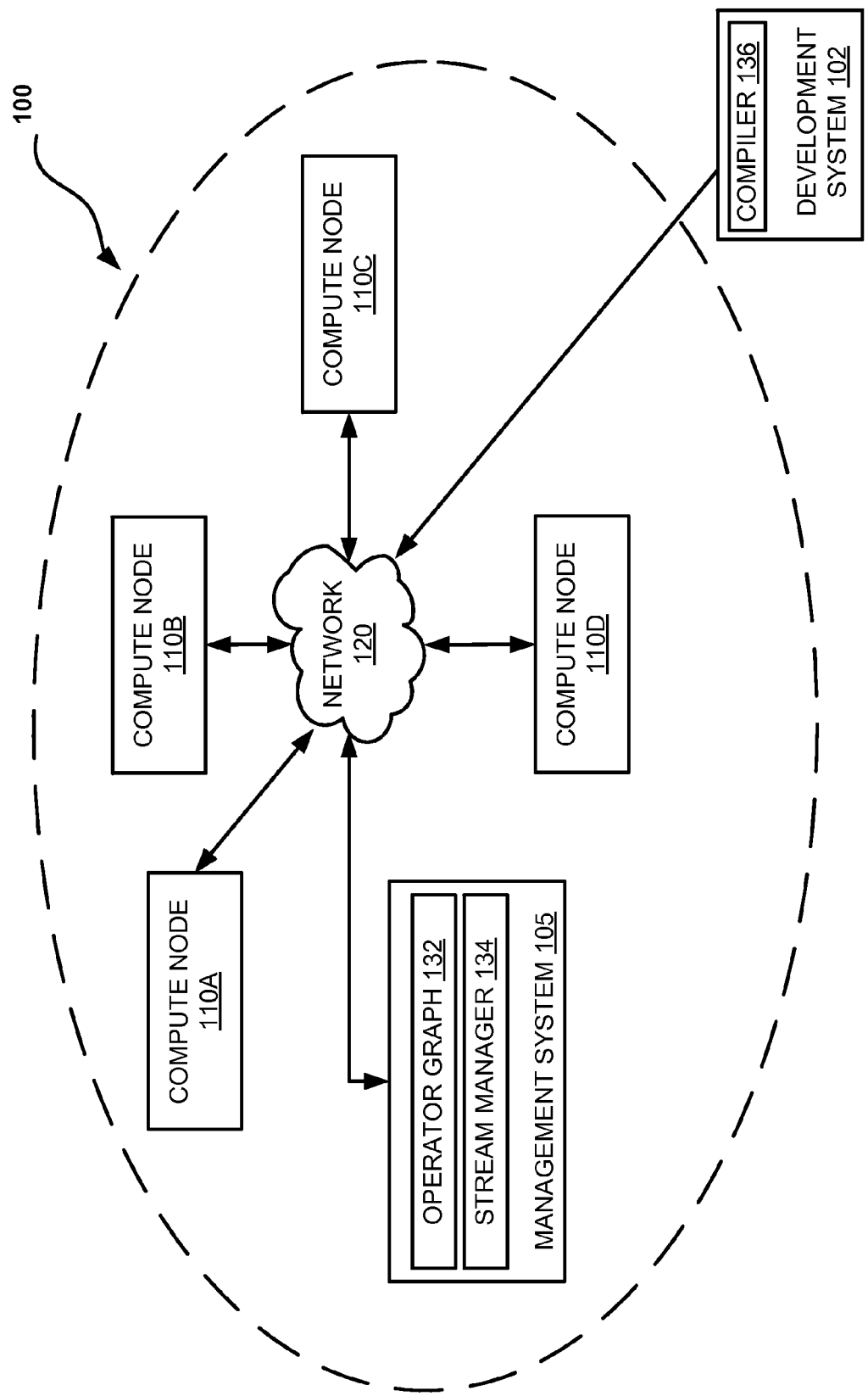
FIG. 1 illustrates a computing infrastructure configured to execute a stream computing application, according to various embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to stream computing. In embodiments, more particular aspects relate to tuple attribute copying for mutable stream operator ports. While the present disclosure is not necessarily limited to such applications, various aspects of the disclosure may be appreciated through a discussion of various examples using this context.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. For stream operators, a tuple may be changed according to port mutability conditions. Port mutability is a characteristic of a stream operator and applies to tuples processed or submitted by the stream operator. The mutability of input ports indicate the intent of the stream operator logic to change incoming tuples. The mutability of the stream output ports indicate whether the stream operator grants permission for submitted tuples to be modified by downstream operators. For example, a mutable input port indicates that a stream operator intends to modify the tuples received at the port while an immutable input port indicates that the stream operator is only going to read, and not modify, the received tuple.

Attribute mutability/immutability may depend on both the tuple type definition and/or tuple processing logic. Each tuple attribute may have a corresponding attribute mutability condition that defines whether a stream operator receiving the tuple intends to modify the attribute. An attribute that will not be modified by the receiving stream operator is considered immutable, while an attribute that will be modified by the receiving stream operator is considered mutable. An attribute or metadata from a tuple may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

An operator graph can be an execution path for a plurality of stream operators to process a stream of tuples. In addition to stream operators, the operator graph can refer to an execution path for processing elements and the dependent stream operators of the processing elements to process the stream of tuples. Generally, the operator graph can have a plurality of stream operators that produce a particular end result, e.g., calculate an average. An operator graph may be a linear arrangement of processing elements and/or operators, or it may include one or more distinct execution paths, also known as sub-processes, methods, or branches.

As tuples are passed between stream operators, there are two common scenarios. A stream operator may either read or read and modify tuples. For example, when downstream stream operators only need to read the tuple, a tuple reference may be used and multiple operators may use the same reference. Conversely, for example, when downstream stream operators need to both read and modify the tuple, a tuple copy may be used and multiple operators may receive their own copy of the tuple. In the second example (e.g., when tuple copying is used), multiple copies of a tuple are made even though less than all attributes of the tuple may be utilized downstream. For instance, a filter stream operator may access only a single tuple attribute (e.g., a stock ticker symbol) prior to discarding the tuple. This leads to multiple copy requests that are never needed. Additionally, creating multiple copies of a tuple may influence how programs are written. For example, instead of copying an entire text file into memory such that a downstream stream operator can access the file from memory, a file pointer is used and each downstream stream operator is required to read the file from disk prior to computation, resulting in compounding performance issues.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
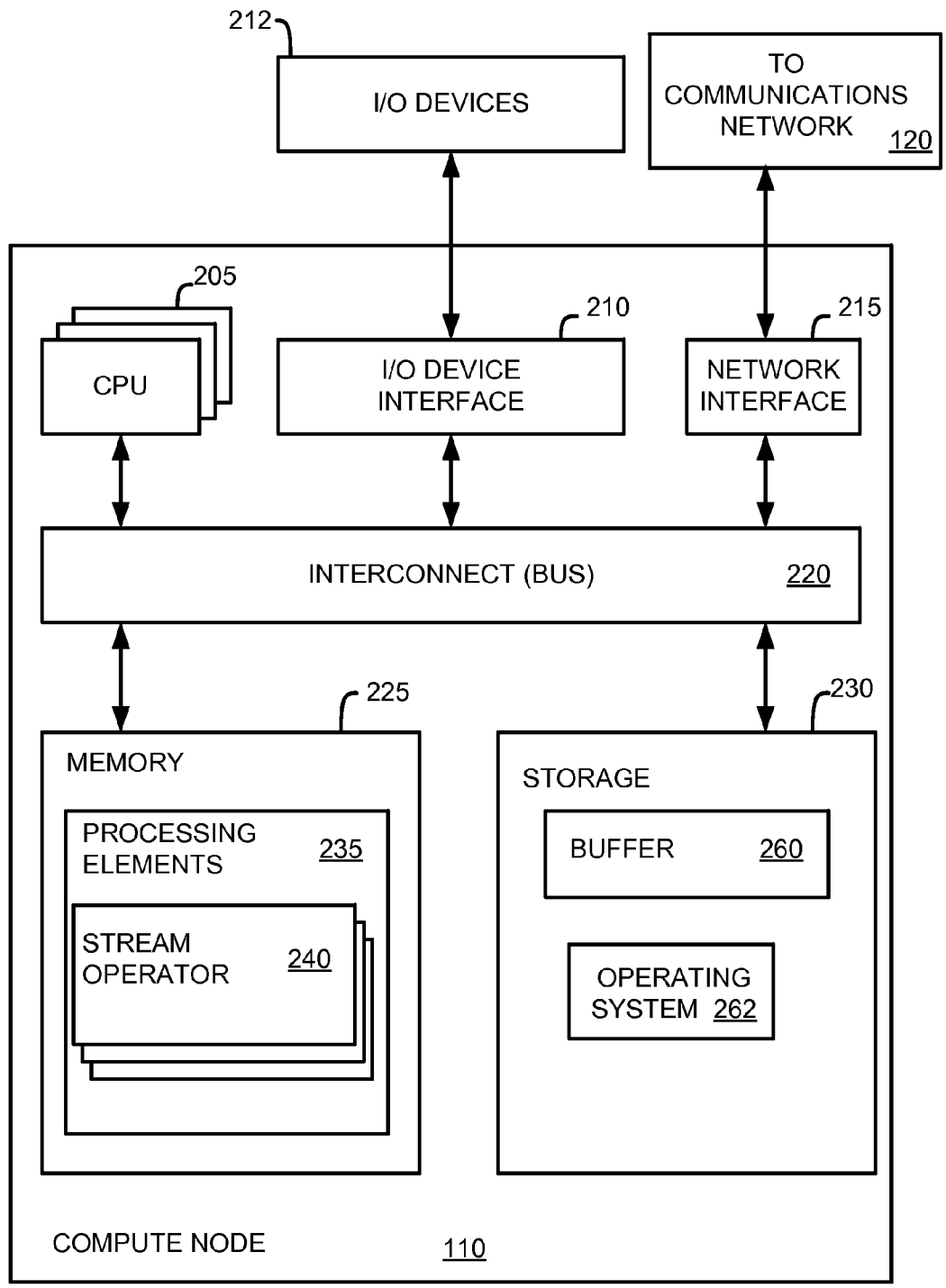
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. Two or more processing elements 235 may run on the same memory 225, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
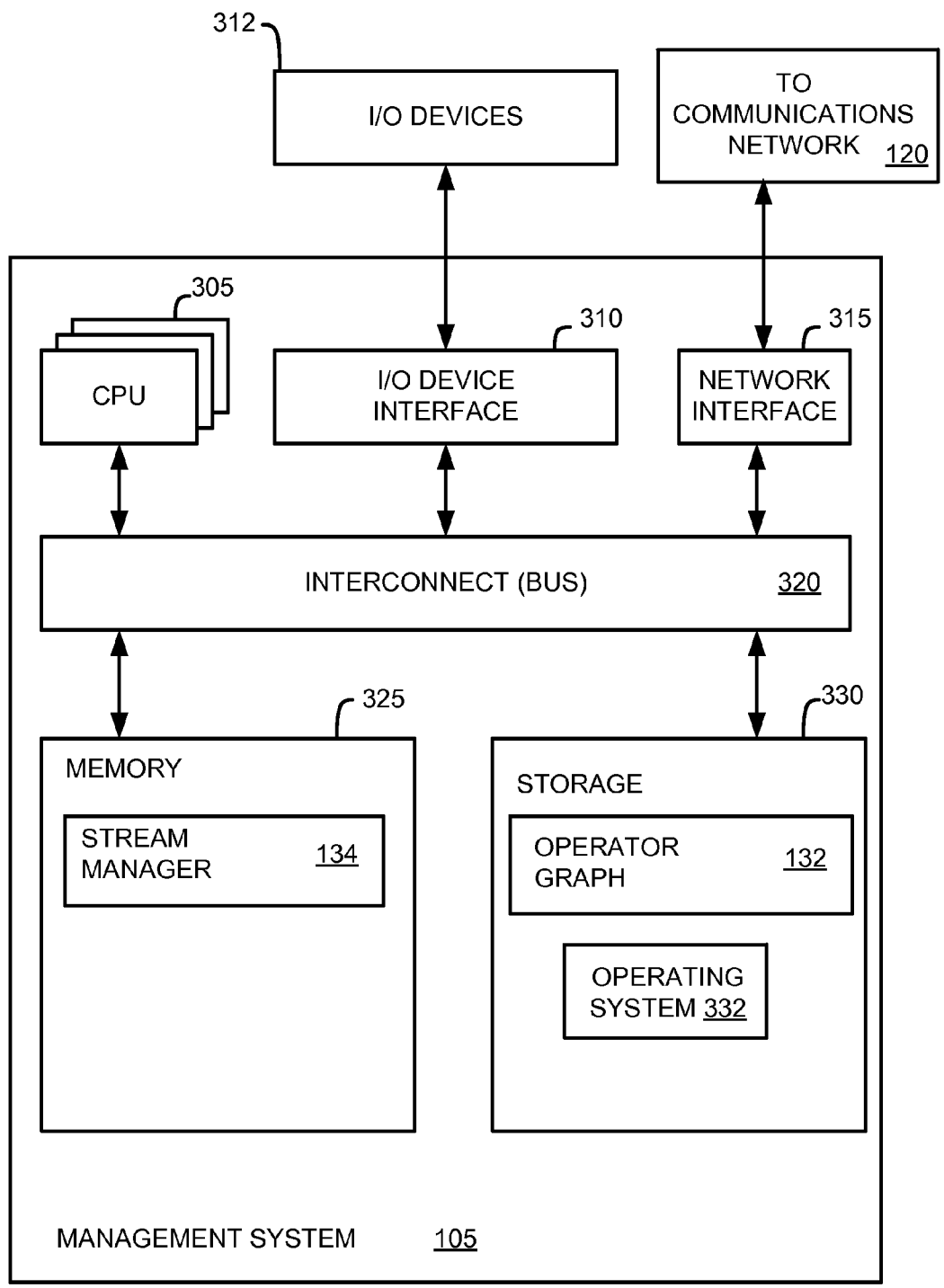
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 132. The operator graph 132 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
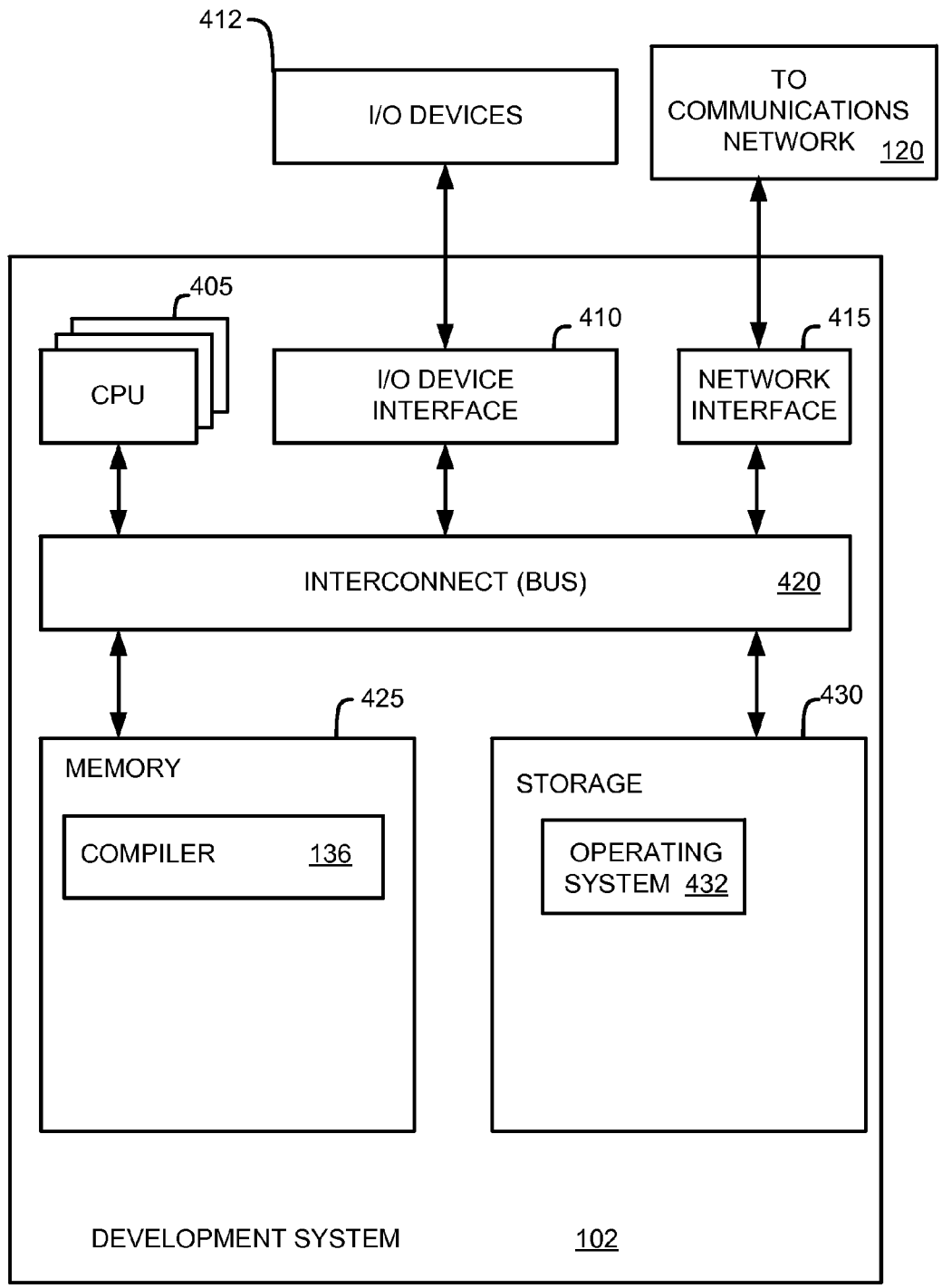
FIG. 4 illustrates a more detailed view of the development system of FIG. 1, according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132 of FIG. 1.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
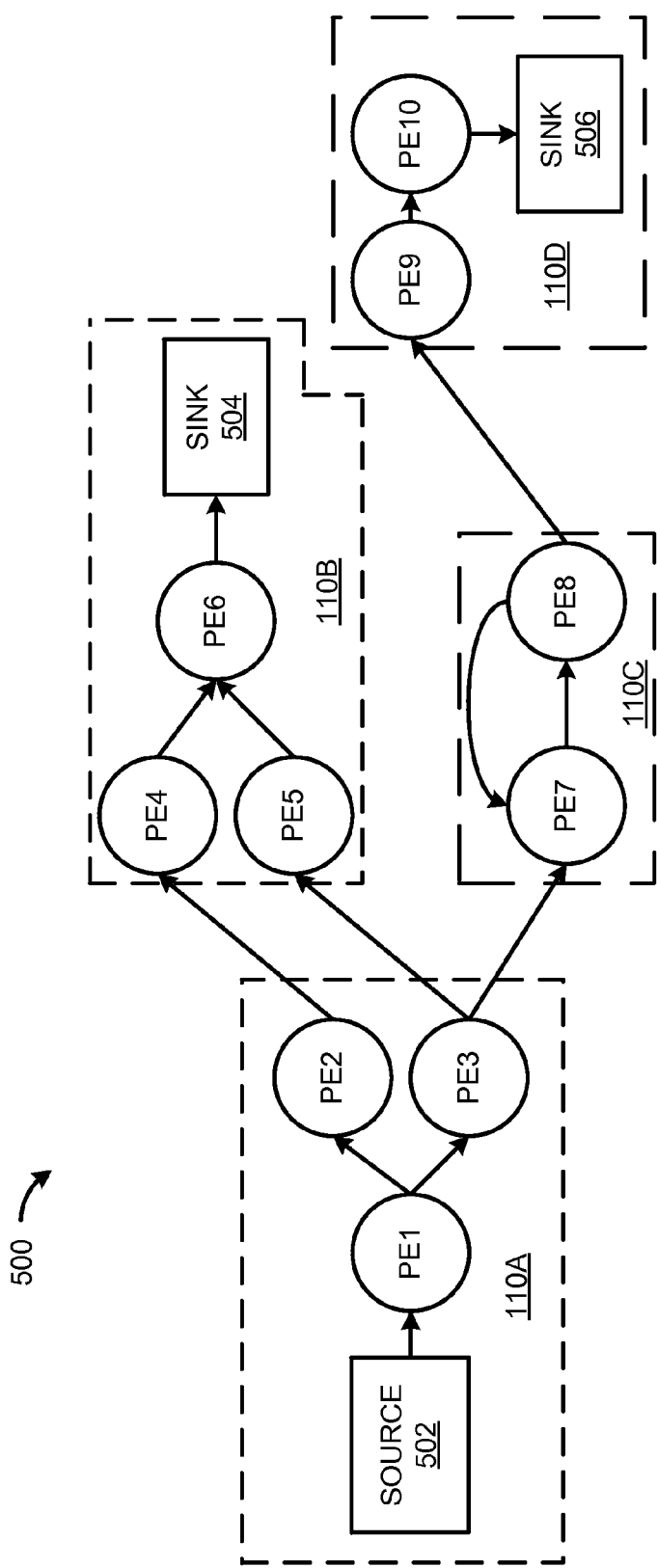
FIG. 5 illustrates an operator graph for a stream computing application, according to various embodiments.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Compute node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to PE6 before being transmitted to a sink 504. Similarly, tuples flowing from PE3 to PE5 also reach PE6 and are sent to a sink 504. Thus, PE6 could be configured to perform a join operation, combining tuples received from PE4 and PE5, before sending the data to the sink 504. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in PE10 before being sent to a sink 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
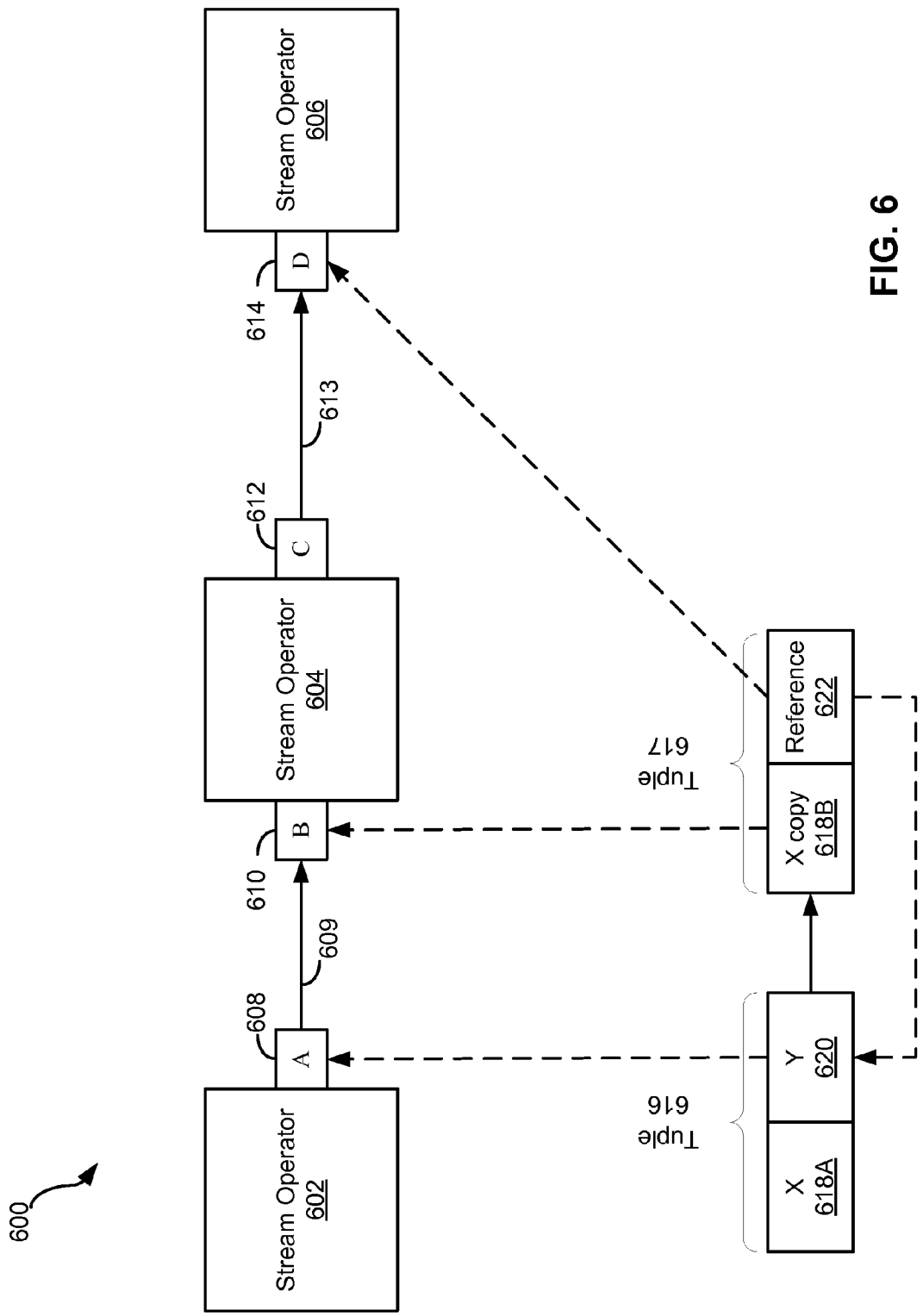
FIG. 6 illustrates one embodiment of an example operator graph containing stream operators with different mutability settings.

FIG. 6 illustrates one embodiment of an example operator graph 600 containing stream operators with different mutability settings. The operator graph 600 comprises a plurality of stream operators 602-606, output ports A 608 and C 612, and input ports B 610 and D 614. Streams 609 and 613 carry tuples 616 and 617 through the plurality of stream operators 602-606. The tuple 616 comprises an attribute X 618A and an attribute Y 620 whereas the tuple 617 comprises an attribute X copy 618B and an attribute reference 622.

The stream operators 602-606 included in the operator graph 600 may be part of a single processing element. In embodiments, the stream operators 602-606 may each belong to separate processing elements. In further embodiments, the stream operators 602-606 may each occupy their own individual memory space. However, in an embodiment where the stream operators 602-606 do not share memory space with one another, they may require access to the memory space occupied by each individual stream operator.

The output ports A 608 and C 612, and input ports B 610 and D 614, may interact with streams 609 and 613 entering and/or leaving stream operators 602-606. Specifically, output port A 608 transmits stream 609 from the stream operator 602 to the input port B 610 of the stream operator 604. Similarly, output port C 612 transmits stream 613 from the stream operator 604 to the input port D 614 of the stream operator 606.

The tuple 616 is part of the stream 609 leaving the output port A 608 from the stream operator 602 going to the input port B 610 of the stream operator 604. In embodiments, the tuple 616 may comprise a plurality of attributes. The tuple 617 is part of the stream 613 leaving the output port C 612 from the stream operator 604 going to the input port D 614 of the stream operator 606. The attribute X copy 618B is a copy of the attribute X 618A from the tuple 616. For example, the attribute X copy 618B may be made at the input port B 610 of the stream operator 604. In various embodiments, a copy of an attribute may include all of the data/metadata comprising the attribute. The attribute reference 622 is a reference to the attribute Y 620 from the tuple 616. In embodiments, the attribute reference 622 may be a file pointer inserted into the place of an attribute within a tuple, where the file pointer directs a downstream stream operator to access and read the file associated with the attribute from disk memory (e.g., shared/unshared memory) prior to computations. For example, the attribute reference 622 may direct the input port D 614 of the stream operator 606 to the attribute Y 620 of the tuple 616, which may be saved and/or stored in the memory space of the stream operator 602.

Attribute copying within the example operator graph 600 may be dependent upon the port mutability conditions for the stream operators 602-606. In some embodiments, attribute copying within the example operator graph 600 may be dependent upon the attribute mutability conditions for attribute X 618A and attribute Y 620 from tuple 616 and attribute X copy 618B and attribute reference 622 from tuple 617. In some embodiments, the port mutability conditions for the stream operators 602-606 may be determined from the logic that is applied to each stream (e.g., streams 609 and 613) passing through the input and/or output ports associated with the stream operators 602-606. When an input port is configured to be mutable, the stream operator intends to modify tuples received at the input port. Conversely, when an input port is configured to be immutable, the stream operator intends to only read the tuples received at the input port. Similarly, when an output port is configured to be mutable, the stream operator containing that output port allows the modification of the submitted tuple (e.g., the tuple leaving the operator) by a downstream stream operator. Further, when an output port is configured to be immutable, the stream operator intends to only read the tuples received. For operators within a processing element, the port mutability conditions may be explicitly defined. For example, products such as InfoSphere® Streams (InfoSphere is a registered trademark of International Business Machines Corporation of Armonk, N.Y.) specify port mutability conditions as stream operator metadata in a separate stream operator model file.

Attribute mutability conditions for the attributes X 618A, Y 620 and X copy 618B may be determined from and/or based on the logic that is applied to each attribute within a tuple. In embodiments, attribute mutability conditions may depend on the tuple type definition and/or the tuple processing logic. The tuple type definition is a classification identifying one of the various types of data for each attribute, such as real, integer or Boolean, that determines the possible values for that type, the operations that can be done on the values of that type, the meaning of the data, and/or the way values of that type can be stored. The tuple processing logic is the code/program that reads or modifies a tuple (e.g., a stream operator). In various embodiments, attribute mutability conditions may be inferred from the tuple processing logic. In certain embodiments, similar to port mutability conditions, attribute mutability conditions may be explicitly declared.

In the operator graph 600, a stream containing a plurality of tuples may enter the stream operator 602 through an input port not shown. The port mutability conditions may be determined before any tuple processing occurs. In embodiments, the port mutability conditions may be determined while tuple processing occurs. Thus, for example, it may be determined that the output port A 608 for the stream operator 602 is immutable and the input port B 610 for the stream operator 604 is mutable. Accordingly, tuple copying will occur because the stream operator 604 intends to modify the tuple 616 (e.g., received the tuple 616 at the mutable input port B 610) and the stream operator 602 is configured to disallow modification of the tuple 616 (e.g., it transmitted the tuple 616 from the immutable output port A 608).

The attribute mutability conditions for the attributes X 618A and Y 620 of the tuple 616 may be inferred by the data streaming language compiler if it understands the tuple processing logic. For example as shown in Table 1, in the data flow fragment written in a Streams Processing Language (e.g., a distributed data flow composition language that is used in InfoSphere® Streams), the streaming language compiler can infer that only the attribute X 618A needs to be copied:

TABLE 1

```
type Number = float64 x, list<float64> y;
/* Non-mutating output port. (e.g., output port A 608)*/
Stream<Number> RandNumbers = Stream Operator 602 ( ) {
    output
        RandNumbers: x = random ( ),
                y = random (10);
}
/*The Stream Operator 604 has a mutating input port (e.g., input port B
610) and a mutating output port (e.g., output port C 612). The stream
operator 604 modifies the "x" attribute (attribute X 618A) before
resubmitting the tuple 616. When placed downstream from a non-mutating
output port (output port A 608), only a tuple copy of attribute "x" is
needed. A compiler can figure this out when parsing the 'logic' clause and
selectively copy only the "x" attribute.*/
stream<Number> NewX = Custom (RandNumbers) {
    logic
        onTuple RandNumbers: {
            // Input attribute "x" is changed
            RandNumbers .x += 10.0;
            submit (RandNumbers, NewX);
        }
}
```

The attribute mutability conditions for the attributes X 618A and Y 620 of the tuple 616 may be explicitly specified when the data streaming language compiler does not have visibility into the operator logic. For example, Table 2 is a data flow fragment written in SPL where the stream operator 602 is connected to a primitive stream operator (e.g., steam operator 604). The SPL compiler does not have access to the tuple processing logic implemented by the primitive operator, therefore attribute mutability conditions may be explicitly declared using the "const" keyword:

TABLE 2

```
type Number = float64 x, list<float64> y;
/*Non-mutating output port*/
stream<Number> RandNumbers = Stream Operator 602 ( ) {
    output
        RandNumbers : x = random ( ),
                y = random (10);
}
/*Mutating input port of Stream Operator 604 connected to a non-mutating
output port of Stream Operator 602, so tuple copying is needed. By
declaring the 'y' attribute as const, the compiler understands that 'y' does
not need to be copied; instead, the 'y' attribute of the tuple copy will
reference the 'y' attribute of the source.*/
stream<Number> NewX = MyPrimitiveOp (stream <float64 x, const
list<float64> > RandNumbers) {
    Param some Param : 1;
}
```

Once the port mutability conditions for the stream operators 602-606 are determined as well as the attribute mutability conditions for the tuple 616 and the attribute mutability conditions for the tuple 617, the streams 609 and 613 may be processed through the operator graph 600. For the examples above, the compiler determined that the stream operator 604 only changes the attribute X 618A, so the stream operator 604 makes a copy of the attribute X 618A and places a reference to the attribute Y 620 from the tuple 616 into the attribute reference 622 within the tuple 617. The input port D 614 of the stream operator 606 is immutable, and therefore it receives a reference to the attribute Y 620 in the tuple 617 as the attribute reference 622. In embodiments, the stream operator 606 logic may write the data from the tuple 617 to a file. When the stream operator 606 retrieves the attribute reference 622, data from the attribute Y 620 in the tuple 616 may be referenced utilizing stream operator software (e.g., an attribute getter function) without having to make an intermediate copy of the attribute Y 620.

Using the port mutability conditions for the stream operators 602-606 and the attribute mutability conditions for the tuple 616, the operator graph 600 avoids copying attribute Y 620. In embodiments, the tuple data structure of the operator graph 600 may be able to store a reference to the attribute of another tuple (e.g., attribute Y 620). In various embodiments, reference counting may be enabled within the operator graph 600. Reference counting may avoid removing from memory a tuple (e.g., tuple 616) as long as at least one attribute of the tuple is referenced by another tuple (e.g., tuple 617).

Figure 7:
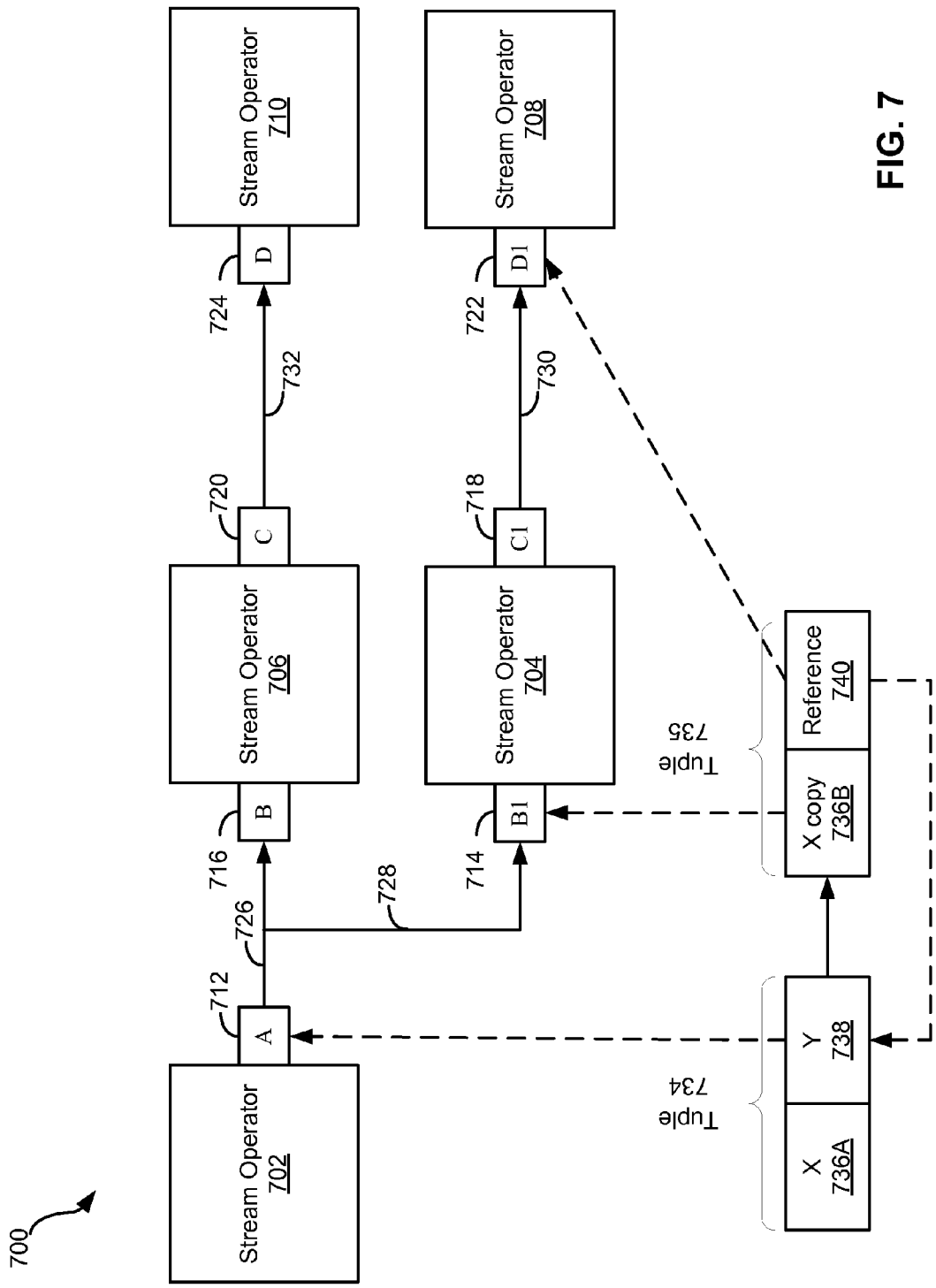
FIG. 7 illustrates a second embodiment of an example operator graph containing stream operators with different mutability settings.

FIG. 7 illustrates a second embodiment of an example operator graph containing stream operators with different mutability settings. The operator graph 700 comprises a plurality of stream operators 702-710, output ports A 712, C1 718, C 720, and input ports B1 714, B 716, D1 722 and D 724. Streams 726, 728, 730 and 732 carry tuples 734 and 735 through the plurality of stream operators 702-710. The tuple 734 comprises an attribute X 736A and an attribute Y 738 whereas the tuple 735 comprises an attribute X copy 736B and an attribute reference 740.

The stream operators 702-710 included in the operator graph 700 may be part of a single processing element. In embodiments, the stream operators 702-710 may each belong to separate processing elements. In further embodiments, the stream operators 702-710 may each occupy their own individual memory space. However, in an embodiment where the stream operators 702-710 do not share memory space with one another, they may require access to the memory space occupied by each individual stream operator.

The output ports A 712, C1 718, C 720, and input ports B1 714, B 716, D1 722, D 724, may interact with streams 726, 728, 730 and 732 entering and/or leaving stream operators 702-710. Specifically, output port A 712 transmits streams 726 and 728 from the stream operator 702 to the input ports B1 714 and B 716 of the stream operators 704 and 706, respectfully. Stream 726 leaving the output port A 712 from the stream operator 702 fans out to create the stream 728. In embodiments, the stream 726 and the stream 728 may comprise the same tuples. In various embodiments, to fan out defines the number of input ports a stream leaving an output port may feed or connect to. For example, the stream 726 fans out more than once (e.g., twice) because it is connected to the input ports B1 714 and B 716 of the stream operators 704 and 706, respectively. Additionally, output ports C1 718 and C 720 transmit streams 730 and 732 from the stream operators 704 and 706 to the input ports D1 722 and D 724 of the stream operators 708 and 710, respectively.

The tuple 734 is part of the stream 726 and/or 728 leaving the output port A 712 from the stream operator 702 going to the input ports B1 714 and B 716 of the stream operators 704 and 706, respectively. In embodiments, the tuple 734 may comprise a plurality of attributes. The tuple 735 is part of the stream 730 leaving the output port C1 718 from the stream operator 704 going to the input port D1 722 of the stream operator 708. The attribute X copy 736B is a copy of the attribute X 736A from the tuple 734. For example, the attribute X copy 736B may be made at the input port B1 of the stream operator 704. In various embodiments, a copy of an attribute may include all of the data/metadata comprising the attribute. The attribute reference 740 is a reference to the attribute Y 738 from the tuple 734. In embodiments, the attribute reference 740 may be a file pointer inserted into the place of an attribute within a tuple, where the file pointer directs a downstream stream operator to access and read the file associated with the attribute from disk memory (e.g., shared/unshared memory) prior to computations. For example, the attribute reference 740 may direct the input port D1 of the stream operator 708 to the attribute Y 738 of the tuple 734, which may be saved and/or stored in the memory space of the stream operator 702.

Attribute copying within the example operator graph 700 may be dependent upon the port mutability conditions for the stream operators 702-710. In some embodiments, attribute copying within the example operator graph 700 may be dependent upon the attribute mutability conditions for attribute X 736A and attribute Y 738 from tuple 734 and attribute X copy 736B and attribute reference 740 from tuple 735. In certain embodiments, the port mutability conditions for the stream operators 702-710 may be determined from the logic that is applied to each stream (e.g., streams 726, 728, 730 and 732) passing through the input and/or output ports associated with the stream operators 702-710.

Attribute mutability conditions for the attributes X 736A, Y 738 and X copy 736B may be determined from and/or based on the logic that is applied to each attribute within a tuple. In embodiments, attribute mutability conditions may depend on the tuple type definition and/or the tuple processing logic. In various embodiments, attribute mutability conditions may be inferred from the tuple processing logic. In certain embodiments, similar to port mutability conditions, attribute mutability conditions may be explicitly declared.

In the operator graph 700, a stream containing a plurality of tuples may enter the stream operator 702 through an input port not shown. The port mutability conditions may be determined before any tuple processing occurs. In embodiments, the port mutability conditions may be determined while tuple processing occurs. Thus, for example, it may be determined that the output port A 712 for the stream operator 702 is mutable, the input port B1 714 for the stream operator 704 is mutable, and the input port D1 722 is immutable. In embodiments, the input port B 716 may be mutable. In various embodiments, the input port B 716 may be immutable. Accordingly, tuple copying will occur because the output port A 712 of the stream operator 702 is mutable (e.g., allows modification of the submitted tuple 734 by downstream operators), the stream 726 leaving the output port A 712 is received by at least two downstream operators (e.g., stream operators 704 and 706), and one of the two downstream operators contains a mutable input port (e.g., the mutable input port B1 714 will modify the received tuple 734).

The attribute mutability conditions for the attributes X 736A and Y 738 of the tuple 734 may be inferred by the data streaming language compiler if it understands the tuple processing logic. For example, similar to the discussion associated with Table 1 in FIG. 6, in the data flow fragment written in SPL, the streaming language compiler can infer that only the attribute X 736A needs to be copied. Conversely, the attribute mutability conditions for the attributes X 736A and Y 738 of the tuple 734 may be explicitly specified when the data streaming language compiler does not have visibility into the operator logic. For example, similar to the discussion associated with Table 2 in FIG. 6, the SPL compiler did not have access to the tuple processing logic implemented by the example operator. Accordingly, the attribute mutability conditions may be explicitly declared, such as using the "const" keyword.

Once the port mutability conditions for the stream operators 702-710 are determined as well as the attribute mutability conditions for the tuple 734 and the attribute mutability conditions for the tuple 735, the streams 726, 728, 730 and 732 may be processed through the operator graph 700. For the examples above, the compiler may have determined that the stream operator 704 only changes the attribute X 736A, so the stream operator 704 makes a copy of the attribute X 736A and places a reference to the attribute Y 738 from the tuple 734 into the attribute reference 740 within the tuple 735. The input port D1 722 of the stream operator 708 is immutable, and therefore it receives a reference to the attribute Y 738 in the tuple 735 as the attribute reference 740. In embodiments, the stream operator 708 logic may write the data from the tuple 735 to a file. When the stream operator 708 retrieves the attribute reference 740, data from the attribute Y 738 in the tuple 734 may be referenced utilizing stream operator software (e.g., an attribute getter function) without having to make an intermediate copy of the attribute Y 738.

Using the port mutability conditions for the stream operators 702-710 and the attribute mutability conditions for the tuple 734, the operator graph 700 avoids copying attribute Y 738. In embodiments, the tuple data structure of the operator graph 700 may be able to store a reference to the attribute of another tuple (e.g., attribute Y 738). In various embodiments, reference counting may be enabled within the operator graph 700. Reference counting may avoid removing from memory a tuple (e.g., tuple 734) as long as at least one attribute of the tuple is referenced by another tuple (e.g., tuple 735).

Figure 8:
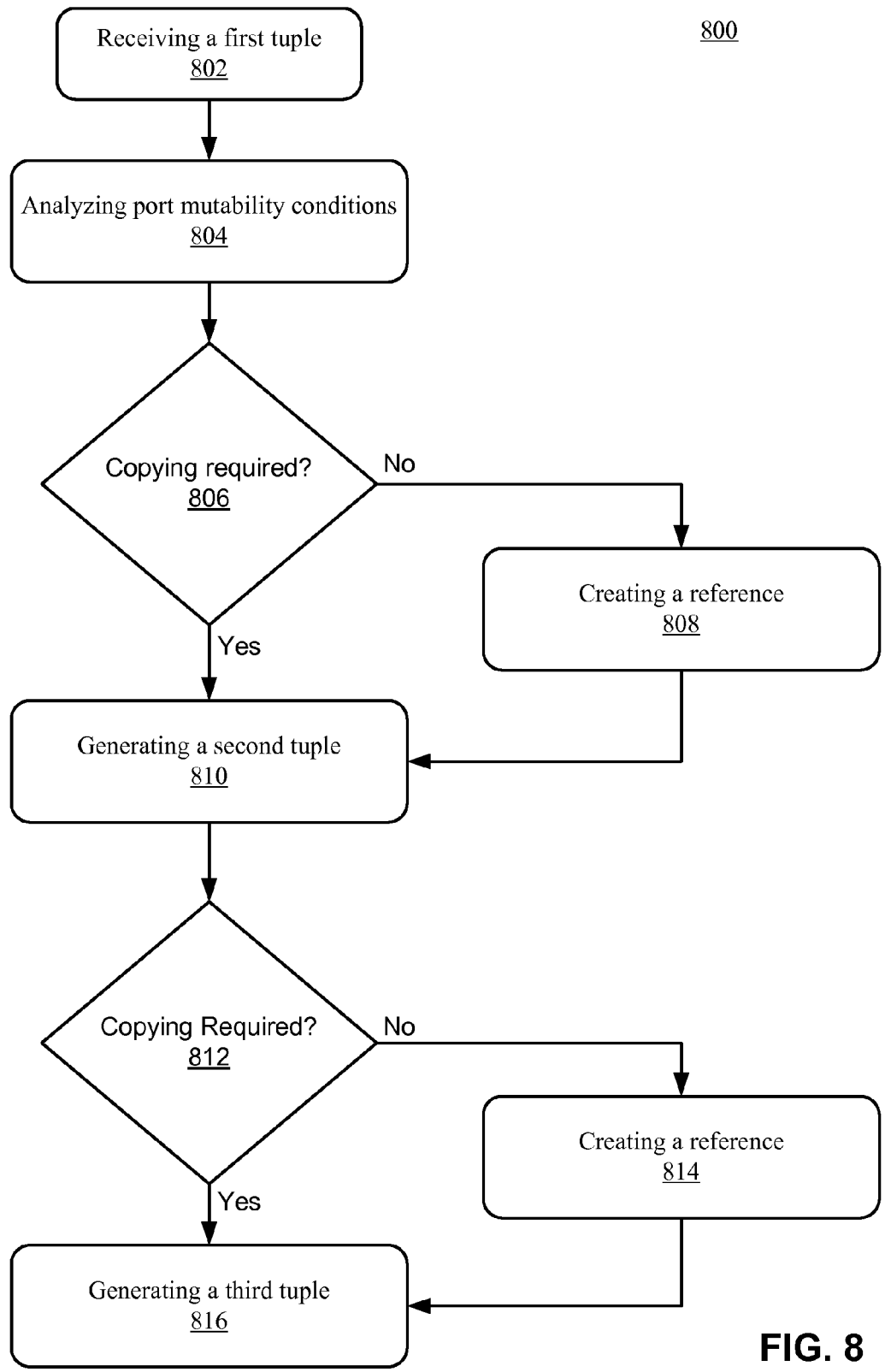
FIG. 8 illustrates one embodiment of an example process for processing a stream of tuples.

FIG. 8 illustrates one embodiment of an example process 800 for processing a stream of tuples. It is to be understood that the order in which the blocks described below are discussed is not to be construed as limiting the order in which the individual acts may be performed. In particular, the acts performed may be performed simultaneously or in a different order than that discussed. The process may begin at block 802, where a first stream operator receives a first tuple from a stream of tuples. In embodiments, the first stream operator may be part of a processing element. In various embodiments, the processing element may comprise a plurality of stream operators. In certain embodiments, the first stream operator may not belong to a processing element.

The first stream operator may include a plurality of input and/or output ports. For example, the first stream operator may be able to process a plurality of streams received by the plurality of input ports and may generate a plurality of outgoing streams leaving the plurality of output ports. The first stream operator is connected to at least one additional stream operator (e.g., a second stream operator discussed herein). In embodiments, the first stream operator may be connected to a plurality of stream operators. Connecting the first stream operator with additional stream operators may include fanning out streams leaving the first stream operator. For example, a singular stream leaving the first stream operator through an output port may connect to two additional stream operators, such as a second stream operator and a third stream operator.

At block 804, the port mutability conditions are determined. In embodiments, determining the port mutability conditions includes analyzing each input/output ports for each operator utilizing the process 800. Analyzing the port mutability conditions may include identifying operators where multiple copies of a tuple will be made. The port mutability conditions may be explicitly defined. For example, products such as InfoSphere® Streams specify port mutability conditions as stream operator metadata in a separate stream operator model file.

At block 806, the process 800 determines whether or not attribute copying is required for a first tuple passing through a first stream operator. Determining whether attribute copying is required may be based upon the attribute mutability conditions for the first tuple passing through the first stream operator and the port mutability conditions for at least two stream operators. For example, when an output port for a first stream operator is immutable and when an input port for a second stream operator is mutable, tuple copying will occur. In another example, when an output port for a stream operator is mutable, the stream leaving the output port of the stream operator is received by at least two additional stream operators, and one of the two additional stream operators has a mutable input port (e.g., a second stream operator with a mutable input port), tuple copying will occur. In some embodiments, aspects of the process 800 may be similar or the same as aspects described in FIG. 6 and FIG. 7 with respect to determining attribute mutability conditions (e.g., see Table 1 and/or Table 2). Accordingly, in some embodiments, the attribute mutability conditions may be inferred from the tuple processing logic. In other embodiments, the attribute mutability conditions may be explicitly declared when a data streaming language compiler does not have visibility into the operator logic. In various embodiments, the process 800 may determine that only a portion of the tuple passing through the first stream operator requires copying. A portion of the tuple may be one or more attributes comprising the tuple. In certain embodiments, the process 800 may determine that the entire tuple requires copying.

At block 808, in response to determining that at least one attribute does not need to be copied, a reference is created for each attribute that does not need to be copied. The reference identifies where in the first tuple the information is stored. In embodiments, a plurality of references may be created. In various embodiments, the tuple data structure of the tuple passing through the first stream operator may be able to store the reference to the attribute of another tuple. Creating a reference may include replacing the unmodified attribute of the tuple passing through the first stream operator with a file pointer. In embodiments, replacing the unmodified attribute of the tuple passing through the first stream operator with a file pointer may include writing the tuple data of the first tuple to a file (e.g., shared memory space). In certain embodiments, creating a reference may include enabling reference counting to avoid deleting from memory the first tuple while one or more of its attributes are referenced by other tuples.

At block 810, a second tuple is generated by the first stream operator and transmitted through an output port to a downstream operator. In some embodiments, generating a second tuple includes applying the logic of the first stream operator to the first tuple. In certain embodiments, generating a second tuple may include replacing unmodified attributes of the first tuple with references created at block 808.

In embodiments, the second tuple may include attributes from the first tuple, copies of attributes from the first tuple, and/or references. In various embodiments, the second tuple may be comprised entirely of references.

At block 812, the process 800 determines whether or not attribute copying is required for the second tuple passing through a second stream operator. In embodiments, determining whether or not attribute copying is required for the second tuple passing through a second stream operator may be similar or the same as that described at block 806. Determining whether attribute copying is required may be based upon the attribute mutability conditions for the second tuple passing through the first stream operator and the port mutability conditions for at least the first stream operator and the second stream operator. In certain embodiments, aspects of the process 800 may be similar or the same as aspects described in FIG. 6 and FIG. 7 with respect to determining attribute mutability conditions (e.g., see Table 1 and/or Table 2).

At block 814, in response to determining that at least one attribute does not need to be copied for the second tuple, a reference is created for each attribute that does not to be copied, the reference identifying where in the second tuple the information is stored. In embodiments, a plurality of references may be created. In various embodiments, the tuple data structure of the tuple passing through the first stream operator may be able to store the reference to the attribute of another tuple. Creating a reference may include replacing the unmodified attribute of the tuple passing through the second stream operator with a file pointer. In embodiments, replacing the unmodified attribute of the tuple passing through the second stream operator with a file pointer may include writing the tuple data of the second tuple to a file (e.g., shared memory space). In certain embodiments, creating a reference may include enabling reference counting to avoid deleting from memory the first tuple and/or second tuple while one or more of its attributes are referenced by other tuples.

At block 816, a third tuple is generated from the output port of the second stream operator. In embodiments, generating a third tuple may include applying the logic of the second stream operator to the second tuple. In certain embodiments, generating a third tuple may include replacing unmodified attributes of the second tuple with references created at block 814. In embodiments, the third tuple may include attributes from the first tuple, copies of attributes from the first tuple, attributes from the second tuple, and/or references. In various embodiments, the second tuple may be comprised entirely of references.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for managing data records in a relational database, the computer program product comprising a computer readable storage medium having program instructions embodied therewith, wherein the computer readable storage medium is not a transitory signal per se, the program instructions executable by a processor to cause the processor to perform a method comprising:

receiving a stream of tuples to be processed by a plurality of processing elements operating on one or more computer processors, each processing element having one or more stream operators, the one or more of the stream operators including code configured to output tuples to one or more other stream operators, the processing elements forming an operator graph in which tuples flow between stream operators, the operator graph defining one or more execution paths for processing and routing the stream of tuples, each processing element having an associated memory space;

receiving at a first stream operator of a first processing element operating on the one or more computer processors, from the stream of tuples, a first tuple;

analyzing port mutability conditions for the first stream operator and port mutability conditions for a second stream operator of a second processing element operating on the one or more computer processors, the second processing element communicatively coupled with the first processing element via an inter-process communication path;

identifying a first set of attribute mutability conditions for the first tuple received at the first stream operator by analyzing tuple processing logic applied to each attribute in the first tuple and a tuple type definition for the first tuple, wherein the first set of attribute mutability conditions define whether the one or more stream operators of each processing element that receive the first tuple can modify attributes of the first tuple, and wherein the tuple type definition for the first tuple defines a data type for each attribute of the first tuple and operations that can be performed on each attribute;

generating, based on the first set of attribute mutability conditions and further based on both the port mutability conditions for the first stream operator and the port mutability conditions for the second stream operator, a reference to a first attribute from the first tuple, the reference to the first attribute being configured to use less bandwidth of the inter-process communication path than the first attribute;

replacing the first attribute from the first tuple with the reference to the first attribute from the first tuple, wherein the reference is added to a second tuple passing from the first stream operator to the second stream operator via the inter-process communication path; and copying, based on the first set of attribute mutability conditions and further based on both the port mutability conditions for the first stream operator and the port mutability conditions for the second stream operator, a second attribute from the first tuple into the second tuple passing from the first stream operator to the second stream operator;

wherein the first attribute and the second attribute are included in the first tuple; and wherein the reference to the first attribute and the copied second attribute are included in the second tuple.

2. The computer program product of claim 1, wherein the second tuple includes attributes from the first tuple.

3. The computer program product of claim 1, further comprising:

receiving at the second stream operator, from the stream of tuples, the second tuple;

identifying a second set of attribute mutability conditions for the second tuple received at the second stream operator;

generating, based on the second set of attribute mutability conditions and further based on both the port mutability conditions for the first stream operator and the port mutability conditions for the second stream operator, a reference to an attribute from the second tuple; and replacing the attribute from the second tuple with the reference of the attribute from the second tuple, wherein the reference is added to a third tuple passing from the second stream operator.

4. The computer program product of claim 3, wherein the third tuple includes attributes from the first tuple and the second tuple.

5. The computer program product of claim 1, wherein the port mutability conditions for the first stream operator and the port mutability conditions for the second stream operator include:
a mutable output port from the first stream operator, wherein the second tuple passing from the first stream operator is received by at least two input ports, one of the at least two input ports being an input port for the second stream operator, the input port for the second stream operator being mutable.

6. The computer program product of claim 1, wherein the port mutability conditions for the first stream operator and the port mutability conditions for the second stream operator include an immutable output port for the first stream operator and a mutable input port for the second stream operator.

7. The computer program product of claim 1, wherein the first stream operator and the second stream operator each utilize separate memory spaces.

8. A computer system for managing data records in a relational database, the computer system comprising:
a memory; and
a processor in communication with the memory, wherein the processor is configured to perform a method, the method comprising:
receiving a stream of tuples to be processed by a plurality of processing elements operating on one or more computer processors, each processing element having one or more stream operators, the one or more of the stream operators including code configured to output tuples to one or more other stream operators, the processing elements forming an operator graph in which tuples flow between stream operators, the operator graph defining one or more execution paths for processing and routing the stream of tuples, each processing element having an associated memory space;
receiving at a first stream operator of a first processing element operating on the one or more computer processors, from the stream of tuples, a first tuple;
analyzing port mutability conditions for the first stream operator and port mutability conditions for a second stream operator of a second processing element operating on the one or more computer processors, the second processing element communicatively coupled with the first processing element via an inter-process communication path;
identifying a first set of attribute mutability conditions for the first tuple received at the first stream operator by analyzing tuple processing logic applied to each attribute in the first tuple and a tuple type definition for the first tuple, wherein the first set of attribute mutability conditions define whether the one or more stream operators of each processing element that receive the first tuple can modify attributes of the first tuple, and wherein the tuple type definition for the first tuple defines a data type for each attribute of the first tuple and operations that can be performed on each attribute;
generating, based on the first set of attribute mutability conditions and further based on both the port mutability conditions for the first stream operator and the port mutability conditions for the second stream operator, a reference to a first attribute from the first tuple, the reference to the first attribute being configured to use less bandwidth of the inter-process communication path than the first attribute;
replacing the first attribute from the first tuple with the reference to the first attribute from the first tuple, wherein the reference is added to a second tuple passing from the first stream operator to the second stream operator via the inter-process communication path; and
copying, based on the first set of attribute mutability conditions and further based on both the port mutability conditions for the first stream operator and the port mutability conditions for the second stream operator, a second attribute from the first tuple into the second tuple passing from the first stream operator to the second stream operator;
wherein the first attribute and the second attribute are included in the first tuple; and
wherein the reference to the first attribute and the copied second attribute are included in the second tuple.

9. The computer system of claim 8, wherein the second tuple includes attributes from the first tuple.

10. The computer system of claim 8, further comprising:
receiving at the second stream operator, from the stream of tuples, the second tuple;
identifying a second set of attribute mutability conditions for the second tuple received at the second stream operator;
generating, based on the second set of attribute mutability conditions and further based on both the port mutability conditions for the first stream operator and the port mutability conditions for the second stream operator, a reference to an attribute from the second tuple; and
replacing the attribute from the second tuple with the reference of the attribute from the second tuple, wherein the reference is added to a third tuple passing from the second stream operator.

11. The computer system of claim 10, wherein the third tuple includes attributes from the first tuple and the second tuple.

12. The computer system of claim 8, wherein the port mutability conditions for the first stream operator and the port mutability conditions for the second stream operator include:
a mutable output port from the first stream operator, wherein the second tuple passing from the first stream operator is received by at least two input ports, one of the at least two input ports being an input port for the second stream operator, the input port for the second stream operator being mutable.

13. The computer system of claim 8, wherein the port mutability conditions for the first stream operator and the port mutability conditions for the second stream operator include an immutable output port for the first stream operator and a mutable input port for the second stream operator.

* * * * *